UNITED STATES PATENT OFFICE.

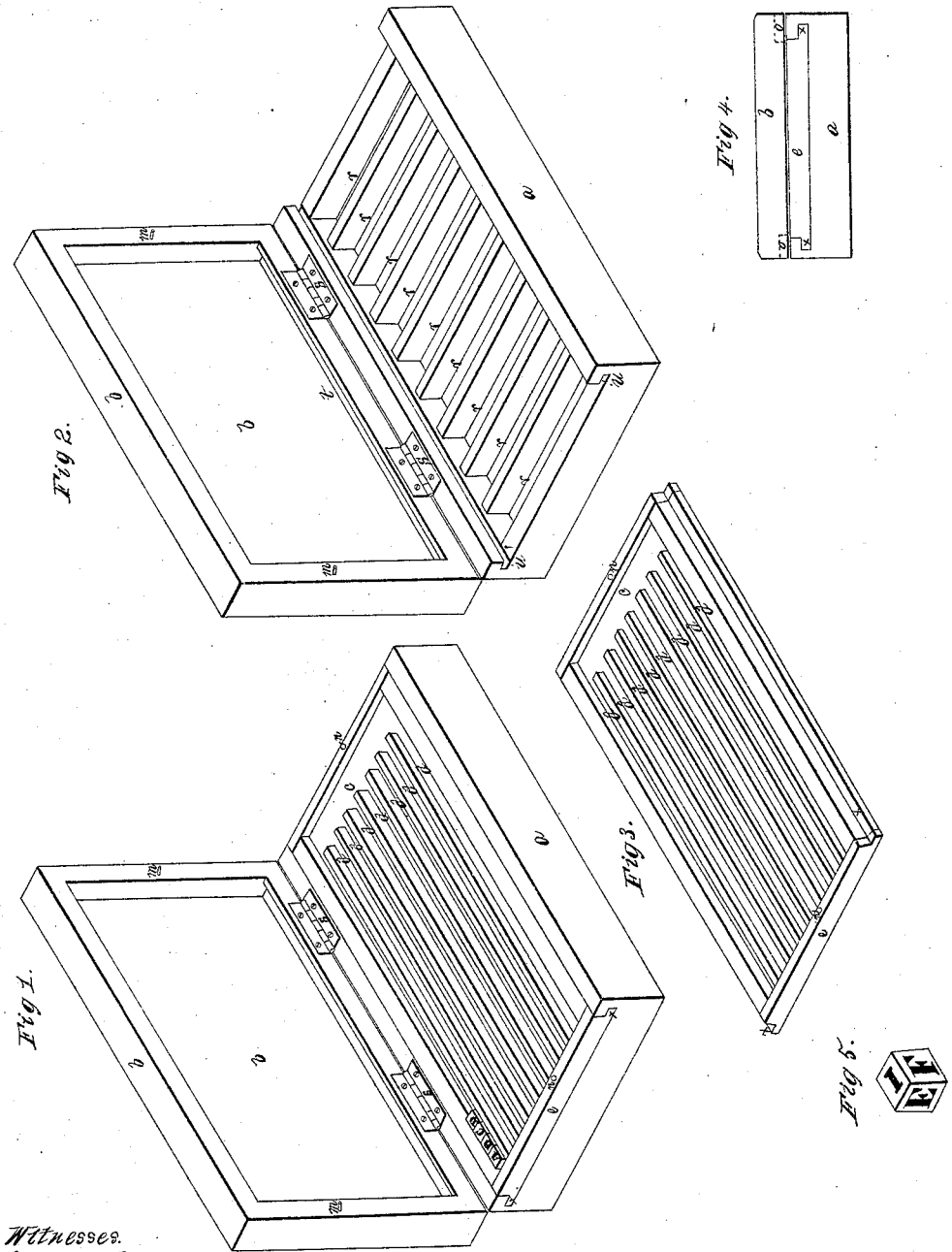

JAMES J. JOHNSTON, OF ALLEGHENY, PENNSYLVANIA, ASSIGNOR TO JAMES R. NEWELL, OF SAME PLACE.

DEVICE FOR TEACHING CHILDREN.

Specification of Letters Patent No. 29,888, dated September 4, 1860.

*To all whom it may concern:*

Be it known that I, JAMES J. JOHNSTON, of the city and county of Allegheny and State of Pennsylvania, have invented a new and useful Device for Teaching Children Reading and Arithmetic; and I do hereby declare that the following is a full and exact description thereof, reference being had to the accompanying drawings and to the letters of reference marked thereon.

The nature of my invention consists in an arrangement of letter-board, letter-case, copy-chamber, and hexagonal blocks with figures and the letters of the alphabet impressed on them; the whole being arranged constructed and operated in the manner hereinafter described and for the purpose set forth.

To enable others skilled in the art to make and use my invention I will proceed to describe its construction and operation.

In the accompanying drawings—Figure 1, is a perspective view of the device, representing the copy-chamber raised up, and the letter-board placed over the letter case. Fig. 2, is a perspective view, representing the copy-chamber raised up, and the letter-board removed—showing the interior of the letter case. Fig. 3, is a perspective view of the letter-board. Fig. 4, is an end view of the copy-chamber, letter-board, and letter-case. Fig. 5, is a perspective view of one of the hexagonal blocks on which the letters and figures are impressed.

(*a*) is the letter case, which is divided into a number of compartments, marked (*r*).

(*u*) are grooves for the tongues (*x*) of the letter-board. The letter-board (*e*) is furnished with a number of grooves (*d*) in which the hexagonal blocks are placed.

(*c*) is an end groove or space which is connected with the grooves (*d*).

(*b*) is the copy-chamber, which is furnished with two grooves marked (*t*), which are formed by the use of the strips seen in Fig. 4 at (*o*).

(*s*) are hinges used for the purpose of uniting the copy-chamber with the letter-case (*a*), and letter-board (*e*).

The pins (*m*) and the holes (*n*) are used for the purpose of holding the letter-board (*e*) in its proper place, when the chamber (*b*) is closed down on the case as represented in Fig. 4.

The letters and punctuation points should be arranged on the hexagonal blocks so as to secure the greatest amount of reading matter or copy possible with the least number of blocks. This is effected by arranging the letters and punctuation points on the blocks in the following proportions—two blocks with j, k, q, x, z, and the colon (:), impressed on them; four blocks with c, d, h, m, u, and the period (.), impressed on them; nine blocks with a, e, i, o, l, n, r, s, and t, impressed on them, and five blocks with b, p, f, v, g, w, y, the comma (,), and the semi-colon (;), impressed on them. The figures 1, 2, 3, 4, 5, 6, 7, 8, 9, 0, the exclamation (!) and interrogation (?) points should be impressed on two blocks.

The advantages obtained by the foregoing arrangement of the letters, figures and punctuation points are, first, it reduces the size of the letter case; second, the number of compartments used for dividing the letters will be greatly diminished; third, it will save greatly in the number of blocks required to furnish a suitable quantity of letters, figures and punctuation points.

The letters, figures, and points may be differently arranged on the blocks, if so desired.

The operation of my improvement is as follows: The copy-chamber is raised up as represented in Figs. 1, and 2. The letter-board is then drawn out to the right, so as to uncover the desired number of compartments in the letter-case. The letters having been suitably arranged in the different compartments, and the copy placed in the copy-chamber, the letters required are then placed one after the other in the groove (*c*), and then moved from it into the grooves (*d*), until a sufficient number of letters, points or figures are arranged in the grooves (*d*), to correspond with the copy placed in the copy-chamber. The teacher then examines the lesson, after which, the letters, points or figures are taken from the grooves (*d*), and distributed into their proper compartments in the letter-case by the scholar. The proper arrangement of the letters in the groove (*d*), is shown in Fig. 1.

The advantages of my improvement in teaching children, are, first, it is highly interesting and instructive to the children; second, it furnishes them with suitable and inexhaustible employment; third, it cultivates concentration of mind, and eminently develops the powers of observation and comparison; fourth, it creates quickness and correctness in forming and apprehending syllables and words; fifth, the eye and hand are exercised in unison; sixth, it begets a great degree of familiarity with the different letters, words, and combinations, and therefore produces a deep and abiding impression on the mind; seventh, it affords constant and pleasant employment in the primary departments of schools, without increasing the labor of the teacher.

Having thus described the nature, construction and operation of my improvement, what I claim as of my invention, and desire to secure by Letters Patent of the United States is—

The arrangement of the copy-chamber (b), letter-board (e), letter-case (a), and hexagonal blocks, with the letters of the alphabet, punctuation-points and figures impressed on them; the whole being arranged and constructed in the manner herein described, and for the purpose set forth.

JAMES J. JOHNSTON.

Witnesses:
GEORGE P. STECK,
CHARLES ROBINSON.